United States Patent Office 3,255,146
Patented June 7, 1966

3,255,146
POLYMER SOLUTIONS STABILIZED WITH MERCAPTO-CONTAINING HETEROCYCLIC COMPOUNDS
Harro Schlesmann and Karl Dinges, Koln-Stammheim, Germany, assignors to Farbenfabriken Bayer Aktiengesellschaft, Leverkusen, Germany, a corporation of Germany
No Drawing. Filed July 5, 1962, Ser. No. 207,811
Claims priority, application Germany, July 17, 1961, F 34,449
8 Claims. (Cl. 260—32.6)

The invention relates to compounds which prevent or at least substantially suppress the discolouration of solutions of polyacrylonitrile or of copolymers which are obtained from acrylonitrile as the main constituent.

Solutions of homopolymers and copolymers of acrylonitrile serve for the production of shaped articles, such as filaments, fibres and the like. However, solutions of the polymer have a tendency to become discoloured, especially at relatively high temperatures. This discolouration then is also transferred to the articles manufactured from these solutions, and this is particularly disadvantageous.

It is an object of the present invention to stabilize acrylonitrile polymers. An additional object is to stabilize spinning solutions which contain acrylonitrile polymers.

One particular object of the present invention is to make available stabilizers for acrylonitrile polymers which act independently of the catalysts used in the polymerization, which cause no deterioration in the dyeing capacity of the spun fibers and also which do not impair the spinnability of the spinning solutions. Other objects will be apparent from the following description and the examples.

It has now been found that the discolouration of solutions of homopolymers or of copolymers of acrylonitrile with at least 80% acrylonitrile can surprisingly be easily prevented, or at least substantially reduced by adding to the polymer, prior to the dissolving thereof a small amount, preferably 0.01 to 5% and advantageously 0.1 to 2% by weight of a five-membered or six-membered heterocyclic compound which contains the following grouping in the heterocyclic ring —N=C(SH)—N=. These compounds comprise for instance the mercaptoderivatives of imidazole, dihydroimidazole, benzimidazole, pyrimidine, dihydropyrimidine, 1,2,4-triazole, dihydro-1,2,4-triazole, 1,2,4-triazine, tetrahydrotriazine and their alkyl preferable lower alkyl, and amino substitution products.

Compounds of this type are 2-mercaptoimidazole, 2-mercapto-4,5-dimethylimidazole, 2-mercaptodihydroimidazole, 2-mercaptobenzimidazole, 2-mercaptopyrimidine, 2-mercapto-4-methylpyrimidine, 2 - mercapto - 4,6,6 - trimethyldihydropyrimidine, 2-mercapto-3,4,6,6-tetramethyldihydropyrimidine, 4-amino-3-mercapto-1,2,4-triazole and 2-thio-5-methyl-1,3,5-perhydrotriazine.

Some of the compounds to be used according to the invention are present in the tautomeric form, in such a way that the carbon atom in the two-position is substituted by a sulphur atom and the adjacent nitrogen atom carries a hydrogen atom. An example of such a compound which exists in the tautomeric form is 2-thio-5-methyl-1,3,5-perhydrotriazine.

The process of the invention is suitable for stabilizing acrylonitrile homopolymers, and also for stabilizing copolymer of acrylonitrile with at least 80% acrylonitrile, containing in addition to acrylonitrile one or more comonomers, such as vinyl acetate, styrene, vinyl chloride, acrylic and methacrylic acid esters and acid amides, unsaturated carboxylic acids, such as acrylic and methacrylic acids, unsaturated sulphonic acids such as vinyl-sulphonic and styrene-sulphonic acids or unsaturated bases such as vinyl pyridine and alkyl-vinyl pyridine.

The process according to the invention can be used in connection with any homopolymer and copolymer of acrylonitrile comprising at least 80% acrylonitrile, regardless of the method which has been used for the preparation thereof, regardless of whether it has been produced by polymerization in block, solution emulsion or suspension, regardless of the catalyst or Redox system used in its preparation and regardless of whether, during the polymerization, substances were already present which improve the thermal stability of the polymer, such as oxalic acid or complex formers. According to the invention, any desired solvents can be used for the shaping of the acrylonitrile polymers, for example dimethyl formamide or dimethyl acetamide.

The solutions containing stabilizer can be processed just as satisfactorily as solutions without stabilizer. The articles manufactured from the stabilizer-containing solutions, such as filaments or fibres, show no discolouration or a substantially smaller degree of discolouration than those produced from solutions without a stabilizer. The mechanical properties of the articles and the capacity for dyeing with dyestuffs are not disadvantageously influenced by the stabilizers.

For estimating the value of the different stabilizers, 0.5% of the stabilizer was added to the polymer and then a 10% solution, based on the polymer, in dimethyl formamide was prepared. Oxygen was conducted through this solution for 5 minutes so that the polymer is exposed to extreme testing conditions. The solution saturated with oxygen was heated for 3 hours to 120° C. Thereafter, the degree of discolouration was determined by measuring the extinction modulus $m\lambda$ at a wave length of $\lambda=4460$ A. The extinction modulus is the extinction based on the layer thickness $d=1$ cm.:

$$m\lambda = \frac{E\lambda}{d}$$

The smaller the extinction modulus, the lesser is the degree of discolouration of the solution.

The invention is further disclosed in the following examples, which are illustrative but not limitative thereof.

Example 1

0.015 gram of 2-mercaptobenzimidazole are added to 3 g. of a copolymer of 95% acrylonitrile and 5% of methyl acrylate, dissolved in 27 g. of dimethyl formamide. Oxygen is bubbled through the solution for 5 minutes and the solution is thereafter heated for 3 hours at 120° C. After cooling, the sample shows an extinction modulus of 0.42 at the wave length $\lambda=4460$ A. A comparison specimen without stabilizer shows an extinction modulus of 0.90.

Example 2

0.015 gram of 2-mercaptobenzimidazole are added to 3 g. of a copolymer of 90% acrylonitrile, 5% methyl acrylate and 5% 2-methyl-5-vinyl pyridine, are thereafter dissolved in 27 g. of dimethyl formamide and subjected to the same treatment as in Example 1. After cooling, the sample shows an extinction modulus of 0.44, whereas the comparison sample without stabilizer has an extinction modulus of 0.80.

Example 3

0.015 gram of 2-mercapto-benzimidazole are added to 3 g. of a polymer of 95% acrylonitrile and 5% of methyl acrylate, prepared by Redox polymerization in the presence of oxalic acid, and thereafter it is treated as in Example 1. The sample shows an extinction modulus of 0.098 whereas the comparison sample without stabilizer has a corresponding value of 0.210.

Example 4

Batches of 0.015 g. of stabilizer were added in each case to 3 g. of a copolymer of 95% acrylonitrile and 5% methyl acrylate and treated as in Example 1. The results are set-out in the following table.

| Stabilizer: | Extinction modulus |
|---|---|
| (a) None | 1.10 |
| (b) 2-mercapto-4-methyl pyrimidine | 0.50 |
| (c) 2-mercapto-4,6,6-trimethyldihydro-pyrimidine | 0.44 |
| (d) 2-mercapto-3,4,6,6-tetramethyldihydropyrimidine | 0.45 |
| (e) 2-thio-5-methyl-1,3,5-perhydrotriazine | 0.29 |
| (f) 4-amino-3-mercapto-1,2,4-triazole | 0.52 |
| (g) 2-mercaptoimidazoline | 0.48 |

What we claim is:

1. A composition of matter consisting essentially of a solution of an acrylonitrile polymer containing at least 80% acrylonitrile in a solvent selected from the group consisting of dimethyl formamide and dimethyl acetamide and from 0.01 to 5% by weight based on the weight of said polymer in solution of a heterocyclic compound containing a mercapto group selected from the group consisting of 2-mercaptobenzimidazole, 2-mercapto-4,6,6-trimethyl - dihydropyrimidine, 2 - mercapto - 3,4,6,6 - tetramethyldihydropyrimidine and 2-thio-5-methyl-1,3,5-perhydrotriazine.

2. A composition of matter consisting essentially of a solution of an acrylonitrile polymer of 95% acrylonitrile and 5% methylacrylate in dimethyl formamide and from 0.1 to 2.0% by weight based on the weight of said copolymer in solution of 2-mercaptobenzimidazole.

3. A composition of matter consisting essentially of an acrylonitrile polymer of 90% of acrylonitrile, 5% methylacrylate and 5% 2-methyl-5-vinyl pyridine in dimethyl formamide and from 0.1 to 2.0% by weight based on the weight of said copolymer in solution of 2-mercaptobenzimidazole.

4. A composition of matter consisting essentially of a solution of an acrylonitrile copolymer of 95% acrylonitrile and 5% methylacrylate in dimethylformamide and 0.1 to 2% by weight based on the weight of said copolymer in solution of 2-mercapto-4-methyl pyrimidine.

5. A composition of matter consisting essentially of a solution of an acrylonitrile copolymer of 95% acrylonitrile and 5% methylacrylate in dimethyl formamide and from 0.1 to 2.0% by weight based on the weight of said copolymer in solution of 2-mercapto-4,6,6-trimethyl-dihydro pyrimidine.

6. A composition of matter consisting essentially of a solution of an acrylonitrile copolymer of 95% acrylonitrile and 5% methylacrylate in dimethyl formamide and from 0.1 to 2% by weight based on the weight of said copolymer in solution of 2-thio-5-methyl-1,3,5-perhydrotriazine.

7. A composition of matter stabilized against discoloration consisting essentially of a mixture of a formed acrylonitrile polymer containing at least 80% acrylonitrile and from 0.1 to 5.0% by weight of a heterocyclic compound containing a mercapto group selected from the group consisting of 2-mercaptobenzimidazole, 2-mercapto-4,6,6-trimethyldihydropyrimidine, 2-mercapto-3,4,6,6-tetramethyldihydropyrimidine and 2-thio-5-methyl-1,3,5-perhydrotriazine, as stabilizer.

8. Process of stabilizing acrylonitrile polymers containing at least 80% acrylonitrile against discoloration, which comprises adding to the formed polymer prior to the dissolution thereof 0.01 to 5.0% by weight of a heterocyclic compound containing a mercapto group selected from the group consisting of 2-mercaptobenzimidazole, 2-mercapto-4,6,6 - trimethyl - dihydropyrimidine, 2-mercapto-3,4,6,6-tetramethyldihydropyrimidine and 2-thio-5-methyl-1,3,5-perhydrotriazine.

References Cited by the Examiner

UNITED STATES PATENTS

| 2,630,421 | 3/1953 | Stamatoff | 260—45.8 |
| 2,689,236 | 9/1954 | Webb | 260—32.6 |
| 2,727,879 | 12/1955 | Vincent | 260—45.7 |
| 2,945,837 | 7/1960 | Eifert et al. | 260—45.9 |

MORRIS LIEBMAN, *Primary Examiner.*

D. W. ERICKSON, L. T. JACOBS, *Assistant Examiners.*